United States Patent [19]

Doshi et al.

[11] Patent Number: 5,133,926

[45] Date of Patent: Jul. 28, 1992

[54] EXTENDED BURNUP TOP NOZZLE FOR A NUCLEAR FUEL ASSEMBLY

[75] Inventors: Pratap K. Doshi, Murrysville Boro; Stephen J. Ferlan, Wilkins Township, Allegheny County, both of Pa.

[73] Assignee: Westinghouse Electric Corp., Pittsburgh, Pa.

[21] Appl. No.: 687,148

[22] Filed: Apr. 18, 1991

[51] Int. Cl.$^5$ .............................. G21C 3/32
[52] U.S. Cl. ............................... 376/445; 376/446; 376/364
[58] Field of Search ............... 376/445, 446, 364, 365, 376/451, 448; 976/DIG. 247, DIG. 254

[56] References Cited

U.S. PATENT DOCUMENTS

| 4,684,502 | 8/1987 | Wilson et al. | 376/446 |
| 4,716,016 | 12/1987 | Demario et al. | 376/446 |
| 4,792,429 | 12/1988 | Hatfield | 376/446 |
| 4,986,959 | 1/1991 | Sparrow et al. | 376/445 |

FOREIGN PATENT DOCUMENTS 62-91891 4/1987 Japan.
62-102186 5/1987 Japan.

Primary Examiner—Brooks H. Hunt
Assistant Examiner—Meena Chelliah

[57] ABSTRACT

A fuel assembly includes an array of fuel rods and guide thimbles disposed in laterally spaced relation to one another. The guide thimbles have upper ends extending above the upper ends of the fuel rods. The fuel assembly also includes a top nozzle defined solely by a flat rectangular adapter plate having a main central portion and a peripheral portion surrounding and merging with the main central portion. The main central portion of the adapter plate has a plurality of attachment holes receiving the upper ends of guide thimbles for attachment of the adapter plate upon the guide thimble upper ends in spaced relation above the fuel rod upper ends. A first sest of holes are defined through one pair of diagonal corners of the adapter plate for use in attaching sets of spring assemblies directly to and upon the adapter plate for alignment along the peripheral portions thereof. Abutments formed at the other pair of diagonal corners of the adapter plate define a second set holes through the adapter plate for use in latching handling equipment directly to the adapter plate for lifting of the top nozzle.

14 Claims, 3 Drawing Sheets

1

EXTENDED BURNUP TOP NOZZLE FOR A NUCLEAR FUEL ASSEMBLY

BACKGROUND OF THE INVENTION

1. Field of the Invention

The present invention relates generally to fuel assemblies for nuclear reactors and, more particularly, is concerned with a top nozzle allowing improved utilization of space for accommodating greater thermal growth and burnup of fuel rods of the fuel assembly.

2. Description of the Prior Art

In most nuclear reactors, the reactor core is comprised of a large number of elongated fuel assemblies which receive support and alignment from upper and lower transversely extending core support plates. The upper and lower core support plates are directly or indirectly attached to a support barrel which surrounds the entire core and extends between the ends thereof.

Conventional designs of these fuel assemblies include a plurality of fuel rods and control rod guide thimbles held in an organized array by a plurality of grids spaced along the fuel assembly length and attached to the control rod guide thimbles. The guide thimbles extend slightly above and below the ends of the fuel rods. Top and bottom nozzles on opposite ends of the fuel assembly are secured to the guide thimbles to thereby form an integral fuel assembly. The fuel assemblies are arranged vertically resting on the lower core support plate. To facilitate handling and installation, the fuel assemblies are generally not secured to the lower core support plate.

Temperatures at various times within the core may vary greatly, such as, from cold shutdown to normal operating conditions. Also, different materials exhibit different thermal growth characteristics. Since the materials of fuel assembly components are generally different than those used in the core support barrel and undergo greater thermal expansion, the resulting increase in length of the fuel assemblies in the axial or vertical direction must be accommodated. For this reason, the fuel assemblies are not usually attached to the upper and lower core plates but rather are supported in a manner which permits some relative motion therebetween.

The axial thermal expansion differential between the fuel assemblies and the core support barrel has been accommodated by insuring that the axial spacing between the upper and lower core support plates is somewhat greater than the axial length of the fuel assemblies. Normally, this is accomplished by providing an axial gap between the top of the fuel assemblies and the upper core support plate. However, the presence of the gap can result in upward lifting of the fuel assemblies due to the hydraulic forces produced on the fuel assemblies in the upward direction by coolant flow. Thus, fuel assemblies have also employed hold-down devices with the top nozzles to prevent the force of upward coolant flow from lifting the fuel assemblies into damaging contact with the upper core support plate, while at the same time allowing for changes in fuel assembly length due to core-induced thermal expansion and the like. Representative of prior art fuel assemblies with hold-down devices are those disclosed in Hatfield (U.S. Pat. No. 4,792,429) and Wilson et al (U.S. Pat. No. 4,684,502) and Japanese Pat. Nos. 62-91891 and 62-102186.

As mentioned previously, the guide thimbles of fuel assemblies extend slightly above and below the ends of the fuel rods. Thus, the top and bottom nozzles of fuel assemblies secured at opposite ends of the guide thimbles likewise are spaced above and below the fuel rod ends. This space between the opposite ends of the fuel rods and adjacent portions of the top and bottom nozzles accommodates increase in length of the fuel rods due to thermal growth as fuel rod burnup occurs during normal reactor operation.

With improvements in various aspects of fuel assembly design, it has become feasible to increase the allowable burnup of the fuel rods. This increase in burnup is desirable because it decreases the frequency of plant shutdowns and the buildup of spent fuel. However, to permit the fuel rods to operate to a higher burnup, an increase of approximately 0.5 inch minimum in fuel rod length is necessary due to extra thermal growth. This necessitates an increase in the space between the adapter plates of the top and bottom nozzles to accommodate this additional fuel rod growth. At the same time, there still must be enough space between the upper core plate and adapter plate of the top nozzle to allow inserting and latching of the handling equipment to the top nozzle.

Currently, there is not enough room between the adapter plates of the top and bottom nozzles to permit the 0.5 inch growth in fuel rod length. Consequently, a need exist for a way to accommodate extra fuel rod thermal growth without impairing the handling capability of the core equipment currently in use.

SUMMARY OF THE INVENTION

The present invention provides a top nozzle having an improved construction designed to satisfy the aforementioned needs. The top nozzle of the present invention is reduced in overall height by about 1.75 inches compared to the prior art top nozzle which enables a fuel assembly to accommodate increased fuel rod length and growth and thereby allow a reactor to operate at a higher burnup rate. The additional space created by the shortened height of the top nozzle can be effectively utilized to provide high burnup capability for the fuel assembly. The additional space may be utilized for additional rod growth and/or making the fuel rod longer with a larger plenum if needed. It is estimated that this additional space of 1.75 inches will provide about 20,000 MWD/MTU in additional burnup capacity.

Accordingly, the present invention is directed to a top nozzle for a nuclear fuel assembly which permits increased fuel rod thermal growth and burnup. The top nozzle comprises: (a) a flat adapter plate having a main central portion and a peripheral portion surrounding and merging into the main central portion; (b) means defining a first set of holes through a first pair of diagonally-opposed locations on the peripheral portions of the adapter plate for use in attaching sets of spring assemblies directly to the adapter plate for alignment along the peripheral portions thereof; and (c) means defining a second set holes through a second pair of diagonally-opposed locations on the peripheral portions of the adapter plate for use in latching handling equipment directly to the adapter plate for lifting of the top nozzle. The means defining the second set of holes is an abutment formed at each of the second diagonally-opposed locations so as to project upwardly from the plane of the upper surface of the adapter plate, with each hole being defined through the respective abutment. The peripheral portion of the adapter plate extending between the first and second pairs of holes is of solid construction. Further, a plurality of spring assemblies are attached directly upon the adapter plate at the holes through the first diagonally-opposed locations.

Also, the present invention relates to a fuel assembly which comprises: (a) an array of fuel rods disposed in laterally spaced relation to one another and having upper ends; (b) an array of guide thimbles disposed in laterally spaced relation to one another and to the fuel rods and having upper ends extending above the upper ends of the fuel rods; and (c) a top nozzle defined solely by the flat rectangular adapter plate described above being attached upon the guide thimble upper ends in spaced relation above the fuel rod upper ends.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
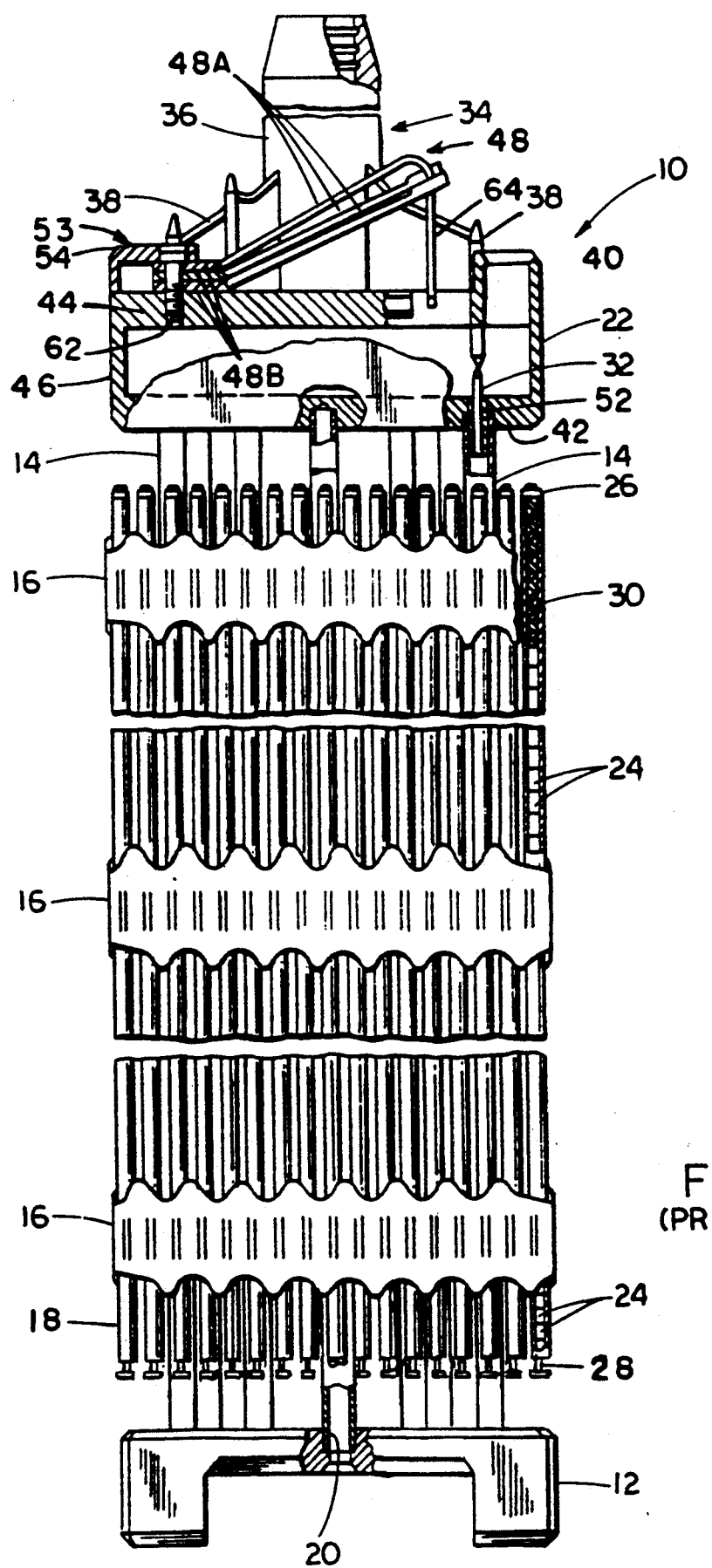
FIG. 1 is a side elevational view of a prior art fuel assembly, partly in section and in vertically foreshortened form with parts broken away for clarity, with a rod cluster control mechanism positioned above the fuel assembly.

Referring now to the drawings, and particularly, to FIG. 1, there is shown an elevational view of a fuel assembly, represented in vertically or longitudinally foreshortened form and being generally designated by the numeral 10. The fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, the top nozzle 22 includes a rod cluster control mechanism 34 having an internally grooved cylindrical member 36 with a plurality of radially extending flukes or arms 38. Each arm 38 is interconnected to a control rod 32 such that the control mechanism 34 is operable to move the control rods 32 vertically in the guide thimbles 14 to thereby control the fission process in the fuel assembly 10, all in a well-known manner.

Prior Art Top Nozzle Construction

Figure 2:
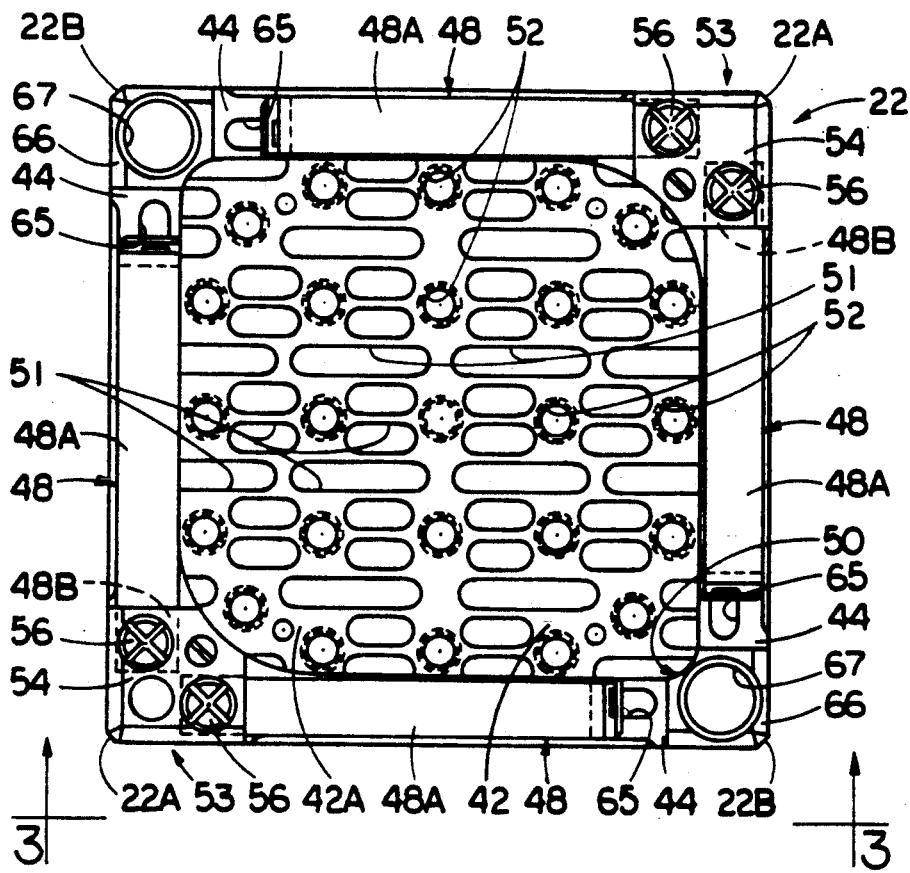
FIG. 2 is an enlarged top plan view of the fuel assembly of FIG. 1, showing the top nozzle of the fuel assembly with the hold-down springs mounted thereon.
Figure 3:
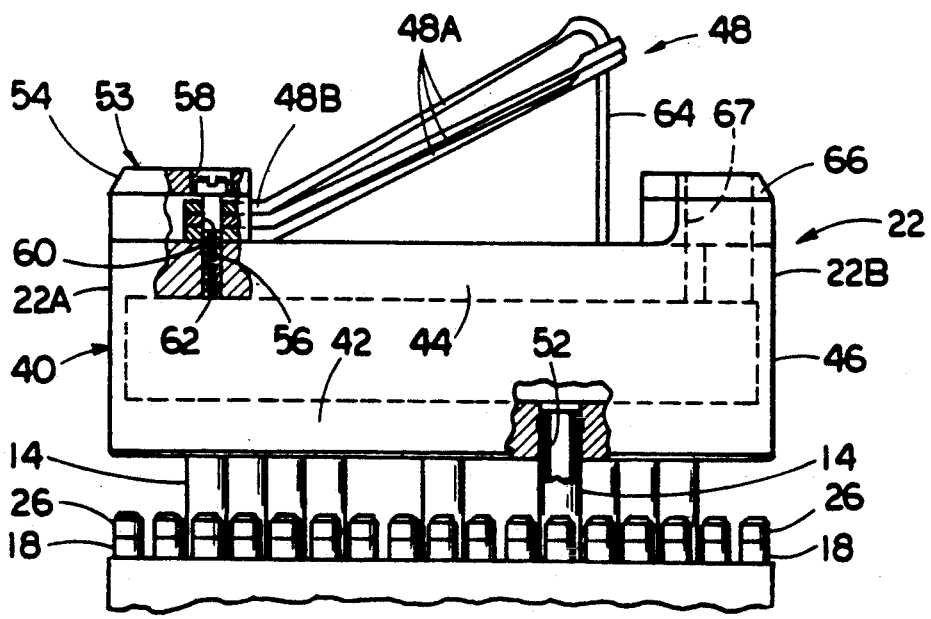
FIG. 3 is a fragmentary side elevational view of the fuel assembly as seen along line 3—3 of FIG. 2.

Referring now to FIGS. 2 and 3 as well as FIG. 1, it can be seen that the prior art top nozzle 22 of the fuel assembly 10 includes an enclosure or housing 40 formed by a transversely extending lower adapter plate 42 and an upper annular flange 44 with an upstanding sidewall 46 extending between and integrally interconnecting the adapter plate 42 and flange 44 at their respective peripheries. Suitably clamped to the upper annular flange 44 are a plurality of spring assemblies 48 which constitute a hold-down device for the fuel assembly 10. Each spring assembly 48 is composed of a set of leaf springs 48A disposed in a stack relation. The spring assemblies 48 cooperate with the upper core plate (not shown) in a conventional manner to prevent hydraulic lifting of the fuel assembly 10 caused by upward coolant flow while allowing for changes in fuel assembly length due to core induced thermal expansion and the like. Also, the rod cluster control assembly 34 (not shown in FIG. 2) is disposed within a central top opening 50 of the top nozzle 22 defined by the annular flange 44. Flow openings 51 and guide thimble attachment holes 52 are defined in spaced apart relation from one another through the main central portion 42A of the lower adapter plate in alignment with the central top opening 50 of the upper annular flange 44.

As seen in FIGS. 1-3, each spring assembly 48 at a base end 48B is fastened and held in its operative position on the top nozzle upper flange 44 by using a spring clamp 53 which includes a corner block 54 and a spring screw 56. There are two spring clamps 53 for holding two pairs of the spring assemblies 48. One spring clamp 53 is provided at each of one pair of opposite diagonal corners 22A of the top nozzle 22 and each spring clamp 53 preferably includes the one clamp block 54 and a pair of spring screws 56 which share the same clamp block for clamping a pair of the spring assemblies 48 at their respective base ends 48B. Each screw 56 is installed through a counterbore 58 defined in the corner block 54 and a hole 60 defined in the base end 48B of the spring assembly 48. The screw 56 is threaded into a threaded hole 62 tapped in the upper annular flange 44. Together with the corner clamp block 54, when the spring screw 56 is tightened down it clamps the spring assembly 48 at its respective base end 48B to the peripheral upper annular flange 44 of the top nozzle 22. Once the screw 56 is tightened down, the corner clamp block 54 is then fixedly attached to the top nozzle flange 44 by welds (not shown). Further, the spring screw 56 is locked against rotation and is retained in place by a lock pin (not shown) which is welded to the inside of the counterbore 58 in the clamp block 54.

In their operative positions, the spring assemblies 48 extend in inclined upward relationship along and within the outer perimeter of the top nozzle housing 40 where they contact the upper core plate. A tang 64 extending downwardly from an upper one of the leaf springs 48A in each of the sets projects into an elongated slot 65 defined in the flange 44 for maintaining the leaf spring sets 48A in alignment with the flange 44 and preventing the leaf springs 48A from inadvertently swinging over the central top opening 50 defined by the upper annular flange 44 where they would interfere with the operation of the rod cluster control mechanism 34.

The other pair of opposite corners 22B of the top nozzle 22 have upwardly projecting abutments 66 formed on the flange 44 and defining holes 67 which receive members of top nozzle handling equipment (not shown). Sufficient space is provided in the top nozzle housing 40 between the upper annular flange 44 and lower adapter plate 42 to accommodate inserting of the handling equipment members through the holes 67 and latching thereof under the flange 44 of the top nozzle 22.

Improved Top Nozzle Construction of the Present Invention

Figure 4:
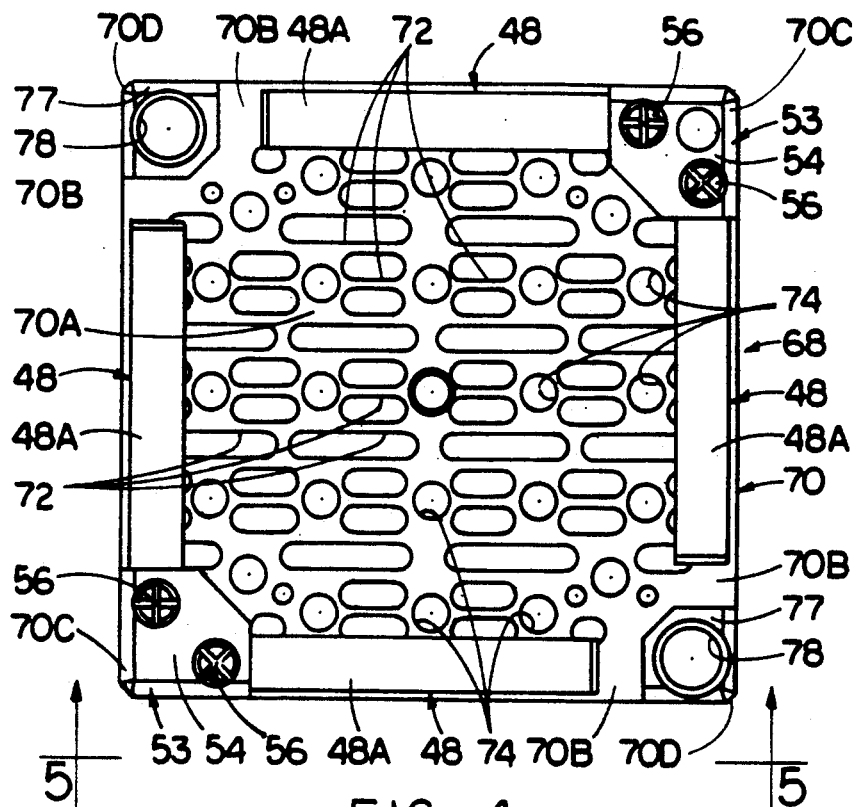
FIG. 4 is a top plan view of a top nozzle of the fuel assembly having the improved construction of the present invention.
Figure 5:
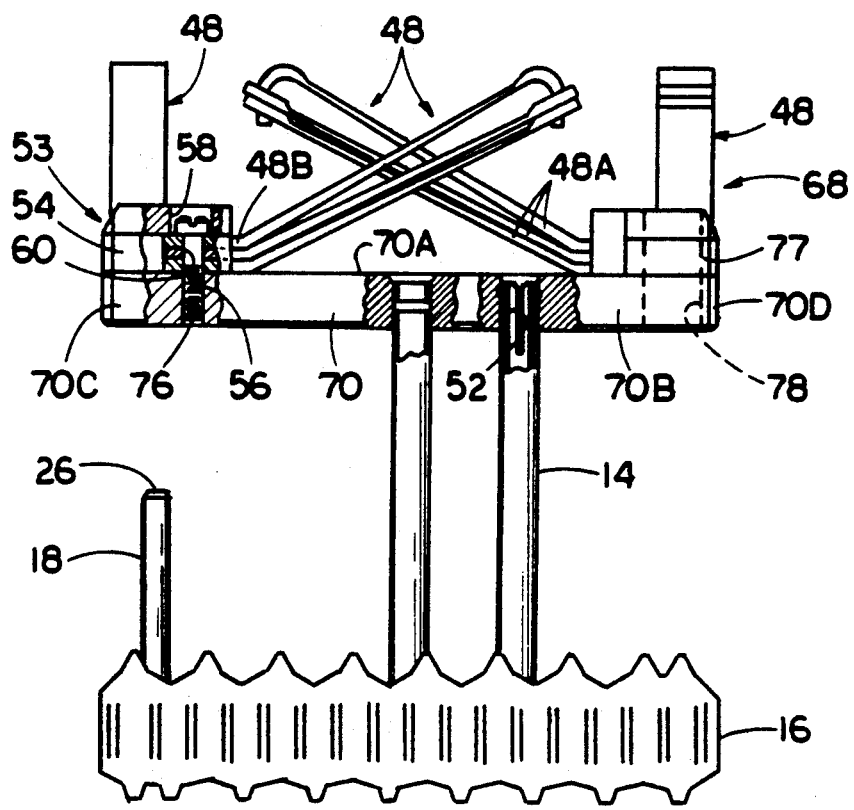
FIG. 5 is a fragmentary side elevational view of as seen along line 5—5 of FIG. 4.

Referring now to FIGS. 4 and 5, there is illustrated a top nozzle, generally designated 68, having an improved construction in accordance with the present invention which provides the top nozzle 68 with a reduced height. The construction of the reduced height top nozzle 68 has only a flat rectangular adapter plate 70 which in and of itself is substantially the same as the lower adapter plate 42 of the prior art top nozzle 22, except for the features pointed out below. The adapter plate 70 retains the main central portion 70A with the array of flow openings 72 and guide thimble holes 74.

However, in the reduced height top nozzle 68, the upper annular flange 44 and upstanding sidewall 46 of the housing 40 of the prior art top nozzle 22 have been eliminated. In effect, the reduced height top nozzle 68 and the adapter plate 70 are now one and the same component. The main central portion 70A of the flat adapter plate 70 is surrounded by a peripheral portion 70B with the main and peripheral portions 70A, 70B defining upper surface portions which merge into one another and lie in a common plane.

Unlike the lower adapter plate 42 of the prior art top nozzle 22, the adapter plate 70 of the reduced height top nozzle 68 has a pair of leaf spring assembly attachment holes 76 defined through each of one pair of diagonal corners 70C thereof. Further, the adapter plate 70 has an upwardly projecting abutment 77 formed on each of the other pair of diagonal corners 70D which defines a handling equipment latch hole 78 through each diagonal corner 70D. Thus, in the case of the adapter plate 70 of the reduced height top nozzle 68, the mounting of the sets of leaf springs 48A is relocated directly to upon the adapter plate 70 and the latching of the handling equipment is directly under the adapter plate 70. The sets of leaf springs 48 now extend along and directly overlie the peripheral portions 70D of the adapter plate 70.

Each spring assembly 48 at its base end 48B is fastened and held in its operative position on the adapter plate corners 70B by using the spring clamp 53, the same as before, which includes the corner block 54 and the spring screw 56. There are two spring clamps 53 for holding two pairs of the spring assemblies 48. One spring clamp 53 is provided at each of one pair of opposite diagonal corners 70B of the adapter plate 70 and each spring clamp 53 preferably includes the one clamp block 54 and pair of spring screws 56 which share the same clamp block for clamping the pair of the spring assemblies 48 at their respective base ends 48B. The spring screws 56 thread into the holes 76, as seen in FIG. 5. It will be noted that the tangs 64 have been eliminated from the spring assemblies 48.

By comparing the prior art top nozzle 22 of FIG. 3 with the reduced height top nozzle 68 of FIG. 5, it becomes readily apparent the substantial increase in the growth gap between the upper end plugs 26 and the bottom side of the respective adapter plate 70 of the top nozzle 68 compared to that of the prior art top nozzle 22. The reduced or shortened height of the top nozzle 68 can be utilized for more fuel rod growth and/or longer fuel rods 18 with larger plenums, enabling the fuel assembly to achieve higher burnup by as much as 20,000 MWD/MTU. It should be mentioned that the adapter plate 70 can be made slightly thicker if needed to minimize deflection and stresses.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A top nozzle for a nuclear fuel assembly, said top nozzle comprising:
    (a) a flat adapter plate defined solely by a main central portion and a peripheral portion surrounding and merging into said main central portion and together forming a common planar upper surface of said adapter plate;
    (b) means defining a first set of holes through said adapter plate at a first pair of diagonally-opposed locations on said adapter plate at said peripheral portion thereof for use in attaching sets of spring assemblies directly to said adapter plate upon said upper surface thereof for alignment above and upon said peripheral portion thereof; and
    (c) means defining a second set holes through said adapter plate at a second pair of diagonally-opposed locations on said adapter plate at said peripheral portion thereof for use in latching handling equipment directly to said adapter plate for lifting of said top nozzle.

2. The top nozzle as recited in claim 1, wherein said means defining said second set of holes includes an abutment formed at each of said diagonally-opposed locations so as to project upwardly from said plane of said upper surface of said adapter plate, said second set of holes also being defined through said abutment.

3. The top nozzle as recited in claim 1, wherein said adapter plate has a square configuration.

4. The top nozzle as recited in claim 1, wherein said main central portion of said adapter plate contains a plurality of coolant flow openings and a plurality of guide thimble attachment openings defined through said adapter plate in spaced relation to one another.

5. The top nozzle as recited in claim 1, wherein said peripheral portion of said adapter plate extending between said first and second pairs of holes is of solid construction.

6. The top nozzle as recited in claim 1, further comprising:
a plurality of spring assemblies having base ends; and
means for directly attaching said base ends of said spring assemblies directly on said adapter plate at said holes through said first pair of diagonally-opposed locations.

7. The top nozzle as recited in claim 6, wherein said attaching means includes:
clamp blocks resting directly on said adapter plate over said holes through said first pair of diagonally-opposed locations on said adapter plate and over said base end of each of said spring assemblies disposed directly on said adapter plate; and
a fastener insertable through said clamp block and attachable to said adapter plate at said holes through said first pair of diagonally-opposed locations on said adapter plate.

8. A fuel assembly, comprising:
(a) an array of fuel rods disposed in laterally spaced relation to one another and having upper ends;
(b) an array of guide thimbles disposed in laterally spaced relation to one another and to said fuel rods and having upper ends extending above said upper ends of said fuel rods;
(c) a top nozzle defined solely by a flat rectangular adapter plate having a main central portion and a peripheral portion surrounding and merging with said main central portion, said peripheral portion and main central portion of said adapter plate together forming a common planar upper surface of said adapter plate, said main central portion having a plurality of attachment holes receiving said upper ends of said guide thimbles for attachment of said adapter plate upon said guide thimble upper ends in spaced relation above said fuel rod upper ends;
(d) means defining a first set of holes through one pair of diagonal corners of said adapter plate at said peripheral portion thereof for use in attaching sets of spring assemblies directly to said adapter plate upon said upper surface thereof for alignment above and upon said peripheral portion thereof; and
(e) means defining a second set holes through the other pair of diagonal corners of said adapter plate at said peripheral portion thereof for use in latching handling equipment directly to said adapter plate for lifting of said top nozzle.

9. The fuel assembly as recited in claim 8, wherein said means defining said second set of holes includes an abutment formed at each of said diagonally-opposed locations so as to project upwardly from said plane of said upper surface of said adapter plate, said second set of holes also being defined through said abutment.

10. The fuel assembly as recited in claim 8, wherein said adapter plate has a square configuration.

11. The fuel assembly as recited in claim 8, wherein said main central portion of said adapter plate contains a plurality of coolant flow openings defined through said adapter plate in spaced relation to one another and to said attachment holes.

12. The fuel assembly as recited in claim 8, wherein said peripheral portion of said adapter plate extending between said first and second pairs of holes is of solid construction.

13. The fuel assembly as recited in claim 8, further comprising:
a plurality of spring assemblies having base ends; and
means for directly attaching said base ends of said spring assemblies directly on said adapter plate at said holes through said first pair of diagonal corners of said adapter plate.

14. The fuel assembly as recited in claim 13, wherein said attaching means includes:
clamp blocks resting directly on said adapter plate over said holes through said first pair of diagonal corners on said adapter plate and over said base end of each of said spring assemblies disposed directly on said adapter plate; and
a fastener insertable through said clamp block and attachable to said adapter plate at said holes through said first pair of diagonal corners on said adapter plate.

* * * * *